Oct. 6, 1964  T. B. DALTON  3,151,707
NO-BACK BRAKE STRUCTURE FOR SEMI-TRAILER LANDING GEAR LEG
Filed May 16, 1962  2 Sheets-Sheet 1
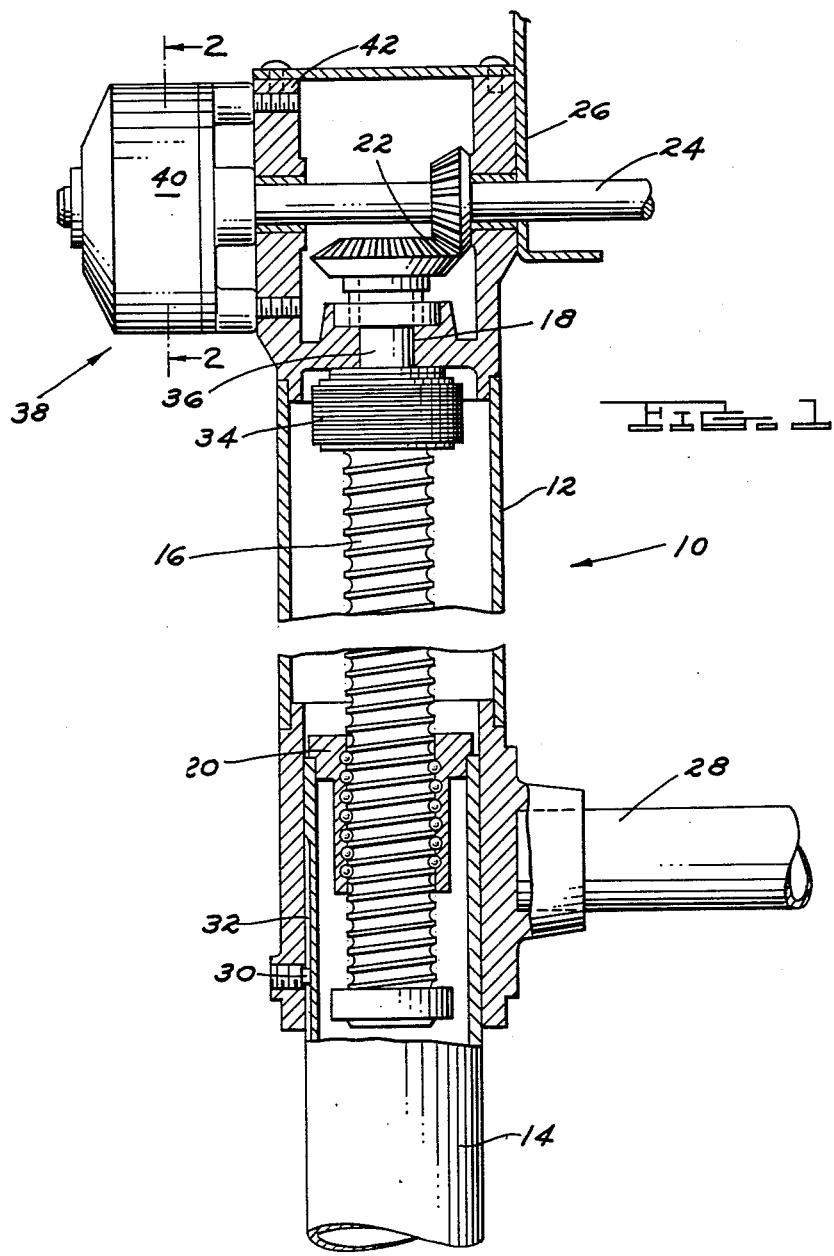
INVENTOR.
THOMAS B. DALTON
BY
Barnes, Kisselle, Raisch & Choate
ATTORNEYS

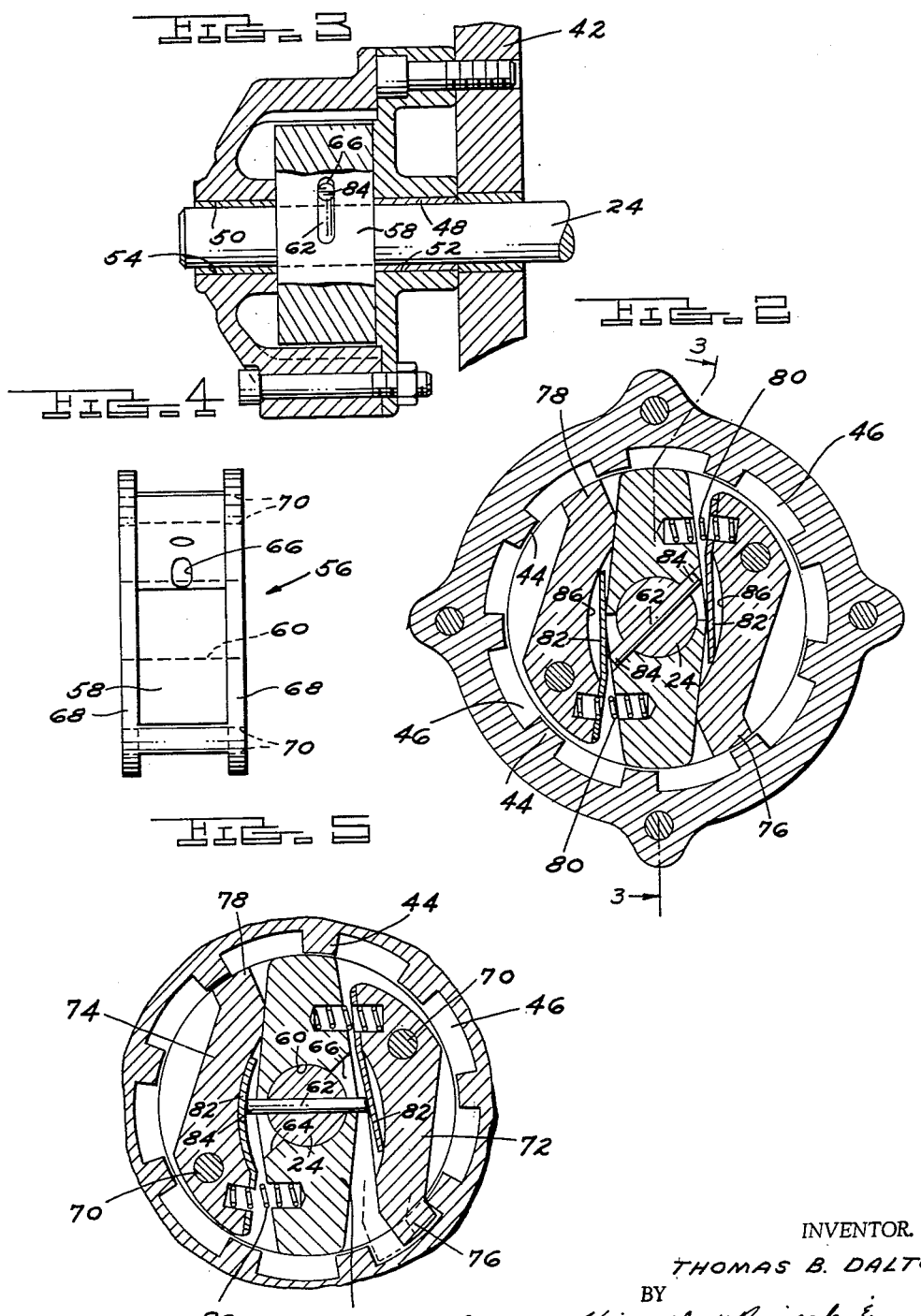

United States Patent Office 3,151,707
Patented Oct. 6, 1964

3,151,707
NO-BACK BRAKE STRUCTURE FOR SEMI-
TRAILER LANDING GEAR LEG
Thomas B. Dalton, Muskegon, Mich., assignor to Westran
Corporation, Muskegon, Mich., a corporation of
Michigan
Filed May 16, 1962, Ser. No. 195,219
8 Claims. (Cl. 188—135)

This invention relates generally to landing gear for semi-trailer vehicles and in particular to a landing gear leg having telescoping leg sections operably interconnected by a jackscrew and recirculating ball-type nut. The ball-type nut is so efficient that the load of the forward end of the trailer on the leg is sufficient to cause retrograde operation of the jackscrew permitting the leg sections to telescope to shortened condition.

To prevent this, the leg-operating structure is usually provided with some form of clutch or brake which restrains load-induced operation of the jackscrew. The devices provided heretofore have been subject to breakage or malfunctioning. When that happens, the leg shortens so rapidly that the forward end of the trailer strikes bottom with a substantial impact capable of damaging the trailer or equipment in or under it. Moreover, the descent is so rapid that a person beneath the forward end of a trailer could be trapped and seriously injured or killed.

The object of this invention is to provide a simple, inexpensive no-back brake structure of improved reliability which can be used either as a safety device in addition to an existing no-back device or which can be used by itself.

The invention generally contemplates the use of an inertia mass mounted on a shaft operably connected with the jackscrew and which, under accelerations incident to normal jackscrew operation, will remain inactive. Under unusual accelerations, as when the jackscrew starts to run down under the load of the trailer, the inertia mass lags behind the shaft through a lost motion connection and the lost motion actuates pawls which engage teeth on a surrounding stationary ratchet to halt rotation of the shaft. One form of the invention is shown in the accompanying drawings.

FIG. 1 is a fragmentary partly diagrammatic view of a landing gear leg to which the no-back brake of this invention is connected.

FIG. 2 is an enlarged generally sectional view on line 2—2 of FIG. 1.

FIG. 3 is a somewhat smaller scale generally sectional view on line 3—3 of FIG. 2.

FIG. 4 is a view of the inertia mass separate from the other parts.

FIG. 5 is a view similar to FIG. 2 but illustrating the relation of the parts in actuated condition of the brake.

Shown in FIG. 1 is a conventional landing gear 10 having an upper, outer leg tube 12 and an inner, lower leg tube 14 which are telescoped between an extended condition for supporting the load of a trailer and a shortened, retracted position. The leg sections are operably interconnected by a jackscrew 16 journaled on the upper leg section as at 18 and a recirculating ball-type nut 20 secured to lower leg tube 14. The jackscrew is rotated by bevel gearing 22 operably connected with a shaft 24 which may be rotated by a suitable motor or hand crank (not shown).

Leg 10 is illustrated as being mounted on a frame member 26 of a semi-trailer and is provided with lateral bracing 28. The leg sections are secured against relative rotation about their common axis by a spline 30 engaged in a spline groove 32. The illustrated form of leg has a one-way helical spring type clutch 34 interposed between the jackscrew proper and its journaled extension 36. Clutch 34 is arranged to facilitate unrestrained extension of the leg sections and to engage automatically responsive to load-induced slight retrograde turning of the jackscrew to prevent it from running down under the load of the semi-trailer.

The no-back brake 38 of this invention includes an outer housing 40 adapted to be mounted on a non-rotatable mount such as the head 42 of leg 12. The housing has an internal circumferential array of ratchet teeth 44 and spaces 46 are provided between the teeth. There is preferably an odd number of teeth 44 and spaces 46 for a purpose to be described.

The housing has axial openings 48 and 50 for rotatably receiving a shaft which is operably connected with jackscrew 16. In the illustrated form of the invention, this shaft is shaft 24, and it is journaled within the housing openings through sleeve bearings 52 and 54. An inertia mass 56 within the housing has a central portion 58 with an opening 60 within which shaft 24 is rockable. A pin 62 projects through shaft 24 and through oppositely disposed generally radially extending tapered openings 64 and 66 to provide a lost rotary motion connection between the shaft and inertia member.

The inertia member has axially spaced disc portions 68 between which extend a pair of pivots 70 and pawls 72, 74 are rockably mounted on these pivots. The pawls have free end portions 76 and 78 respectively which are normally held radially inward out of engagement with the ratchet (FIG. 2) by coil springs 80 disposed in each case on the opposite side of pivot 70 from dogs 76, 78. Coil springs 80 react against central portion 58 of the inertia mass. The inertia mass and pawls are illustrated as being provided with sockets which contain the ends of the coil springs.

Each pawl 72, 74 carries a leaf spring 82 positioned for engagement by an outer end portion 84 of pin 62. Each pawl has a recessed portion 86 over which its leaf spring 82 extends.

In use, it may be assumed that landing gear leg 10 is initially in the extended, load-bearing condition illustrated in FIG. 1. The internal parts of the present no-back brake are in the condition illustrated in FIG. 2, and in particular, dogs 76 and 78 are retained inwardly by compressed springs 80. The parts will remain in this condition for so long as clutch 34 secures jackscrew 16 against load-induced retrograde rotation.

To telescope leg sections 12 and 14 to shortened condition, shaft 24 is turned in a clockwise direction as FIGS. 2 and 5 are viewed. Clutch 34 is released and nut 20 is drawn upwardly carrying leg tube 14 with it. At the same time, shaft 24 causes rotation of pin 62, whose outer ends 84 engage against leaf springs 82. Since acceleration of shaft 24 is relatively slow during normal leg retracting procedure, springs 82 will provide in effect a rigid connection transmitting force to pawls 72, 74 which, in turn, through pivots 70, cause the entire inertia mass assembly to rotate with shaft 24. Dogs 76 remain in their inward position of FIG. 2 and the brake remains inactivated.

If clutch 34 should fail while leg 10 is under load, jackscrew 16 would run down in nut 20 relatively quickly, and the acceleration of shaft 24 would be relatively great. Inertia mass 56 is relatively heavy and resists such acceleration with sufficient force to cause it to lag behind rotation of shaft 24 so that pin ends 84 swing outwardly and exert force on pawls 72, 74 tending to swing their dog ends 76, 78 outwardly into spaces 46 for engagement with one of the ratchet teeth 44. This force is great enough to overcome the relatively inward biasing force of springs 80.

If, at the moment of rocking movement of shaft 24 relative to inertia mass 56, one of the dogs is in radial alignment with a space 46, the dog will immediately move outward for braking engagement with a tooth as described. However, one of the dogs may be radially aligned with a tooth 44 at that moment as illustrated in FIG. 2. When this is the case, pin end 84 still swings outwardly but instead of swinging the dog outwardly, it deflects a leaf spring 82 into recess 86. This condition is illustrated in connection with pawl 74 in FIG. 5. Subsequently, when the pawl clears the tooth, it will be snapped radially outwardly into the adjacent recess 46 by stressed spring 82 for braking engagement with the succeeding tooth.

Teeth 44 and dogs 76, 78 extend circumferentially several degrees of arc so that they are strong enough to sustain the impact of interengagement. As was mentioned above, there is an even number of pawls and an odd number of teeth 44 in spaces 46. With this arrangement, dogs 76, 78 are radially aligned with spaces and teeth at different times. This precludes the possibility of a dog having to move through an arcuate extent equal to the sum of its own arcuate extent and that of a tooth 44 before it can drop into a space 46. The braking action thus occurs at most after a relatively short amount of travel, thereby keeping the braking impact at a low level. For example, in FIG. 2 dog 76 will travel less than the arcuate extent of one tooth 44 before it departs from radial alignment with the tooth and drops into the adjacent space as in FIG. 5.

When the brake is in engaged position with one of its dogs 76, 78 engaged against a tooth 44 (dotted lines, FIG. 5), the tooth provides an obstruction which prevents inward swinging of the dog about its pivot 70. To release the brake, shaft 24 is turned in a counterclockwise direction as FIGS. 2 and 5 are viewed. Pin ends 84 engage against side walls of opening 64, 66 as illustrated in FIG. 2 and rotate the inertia mass and pawl assembly counterclockwise. When the assembly has been retracted to about the position illustrated in solid lines in FIG. 5, dog 76 will clear its engaged tooth and will swing back inwardly to the FIG. 2 position releasing the brake to facilitate operation of jackscrew 16.

While brake 40 is shown as being mounted externally of the leg structure itself, it could equally well be mounted within the leg, for example, in the position of clutch 34. Brake 40 could be used in substitution for clutch 34 or equivalent as well as in addition to it. The main thing is that brake 40 be connected with some shaft having an operable connection with jackscrew 16.

I claim:
1. In a landing gear leg for semi-trailers or the like having telescoping leg sections operably interconnected by a jackscrew and recirculating ball nut, improved brake structure for preventing load-induced retrograde operation of said jackscrew comprising,
   a rotatable shaft operably connected with said jackscrew, an inertia mass rockable substantially concentric on said shaft,
   means providing a ratchet having an annular array of teeth surrounding said inertia mass and substantially concentric with the axis of said shaft,
   pawl means carried by said inertia mass,
   first spring means carried by said inertia mass stressed to bias said pawl means out of engagement with said ratchet,
   said pawl means and shaft having means forming a driving connection through which rotation of said shaft is imparted to said inertia mass at normal operating accelerations of said jackscrew in a retrograde direction,
   said driving connection including means operable to exert outward force on said pawl means greater than the inward bias of said first spring means responsive to inertia lag of said mass relative to said shaft upon extraordinary retrograde acceleration of said shaft, whereby to shift said pawl means radially outwardly into engagement with said ratchet when said pawl means and ratchet teeth are radially disaligned,
   said driving connection including second spring means yieldable to the force of said inertia lag when said pawl means is obstructed from outward shifting by radial alignment thereof with a ratchet tooth,
   said second spring means in yielded condition thereof being operable to urge said pawl means outwardly with a force greater than the inward bias of said first spring means, whereby to snap said pawl means into engagement with said ratchet when said pawl means and ratchet tooth depart from radial alignment.

2. The structure defined in claim 1 wherein said ratchet teeth and pawl means extend circumferentially for several degrees of arc, whereby to sustain the forces incidental to interengagement thereof, said pawl and teeth having generally radially disposed circumferentially extending faces which interengage when said pawl means is urged outwardly and said pawl means and a ratchet tooth are radially aligned, said interengaged faces being circumferentially slidable to facilitate radial disalignment thereof.

3. The structure defined in claim 1 wherein said pawl means is pivotally mounted on said inertia mass, said first spring means and said driving connection acting against said pawl means on opposite sides of the pivot.

4. The structure defined in claim 1 wherein said inertia mass has a central portion with an opening into which said shaft rockably extends, said inertia mass having axially spaced radially extending portions adjacent said central portion, said pawl means being pivotally mounted between the latter-said portions of said inertia mass.

5. The structure defined in claim 1 wherein said inertia mass has a central opening, said shaft extending rockably within said opening, said inertia mass having a generally radial aperture, said shaft having pin means extending through said aperture, said aperture having a circumferential extent greater than that of said pin means to facilitate relative rocking of said inertia mass and shaft, said pin means comprising one element of said driving connection, said pawl means carrying another element of said driving connection, one of said elements being resiliently yieldable to provide said second spring means.

6. The structure defined in claim 5 wherein said second spring means is carried by said pawl means.

7. The structure defined in claim 6 wherein said second spring means comprises a leaf spring and said pin means has an end engaged against a portion of said leaf spring to provide said driving connection.

8. The structure defined in claim 7 wherein said leaf spring has a free end and said aperture's circumferential extent limits relative rocking of said inertia mass and shaft and restrains said pin means from disengaging said spring end.

References Cited in the file of this patent
UNITED STATES PATENTS

| | | |
|---|---|---|
| 2,550,801 | Geerds | May 1, 1951 |
| 2,708,555 | Heinemann et al. | May 17, 1955 |
| 2,922,411 | Skinner | Jan. 26, 1960 |
| 3,016,113 | Easley | Jan. 9, 1962 |